(12) United States Patent
Tamura

(10) Patent No.: US 11,736,947 B2
(45) Date of Patent: Aug. 22, 2023

(54) SIM ROUTER DEVICE, COMMUNICATION TERMINAL DEVICE, METHOD OF ROUTING, AND METHOD OF MANUFACTURING SIM

(71) Applicant: DENSO CORPORATION, Kariya (JP)

(72) Inventor: Ryo Tamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 122 days.

(21) Appl. No.: 17/195,942

(22) Filed: Mar. 9, 2021

(65) Prior Publication Data

US 2021/0195426 A1 Jun. 24, 2021

Related U.S. Application Data

(63) Continuation of application No. PCT/JP2019/038271, filed on Sep. 27, 2019.

(30) Foreign Application Priority Data

Oct. 16, 2018 (JP) ................. 2018-195448

(51) Int. Cl.
 *H04W 12/40* (2021.01)
 *H04W 8/20* (2009.01)
 *H04W 12/06* (2021.01)

(52) U.S. Cl.
 CPC .............. *H04W 12/40* (2021.01); *H04W 8/20* (2013.01); *H04W 12/06* (2013.01)

(58) Field of Classification Search
 CPC ........ H04W 12/40; H04W 8/20; H04W 12/06
 See application file for complete search history.

(56) References Cited

U.S. PATENT DOCUMENTS

| 2002/0103009 A1 | 8/2002 | Sato |
| 2010/0197350 A1 | 8/2010 | Jeung |
| 2010/0279698 A1 | 11/2010 | Wong |

(Continued)

FOREIGN PATENT DOCUMENTS

| GB | 2517762 A | * | 3/2015 | ......... H04L 63/0853 |
| JP | 2002218536 A | | 8/2002 | |

(Continued)

*Primary Examiner* — Barry W Taylor
(74) *Attorney, Agent, or Firm* — Harness, Dickey & Pierce, P.L.C.

(57) ABSTRACT

A SIM router device is configured to access a SIM that stores a first authentication application and a second authentication application. The SIM router device includes a first input interface, a second input interface, a mapping information storage unit, and a controller. The mapping information storage unit is configured to acquire an authentication application list that lists the first authentication application and the second authentication application from the SIM, and store a mapping information in which the first input interface is associated with the first authentication application and the second input interface is associated with the second authentication application. The controller is configured to route, based on the mapping information, a first instruction received by the first input interface to the first authentication application of the SIM, and a second instruction received by the second input interface to the second authentication application of the SIM.

7 Claims, 6 Drawing Sheets

| INPUT INTERFACE | AUTHENTICATION APPLICATION ID | INPUT LOGICAL CHANNEL | OUTPUT LOGICAL CHANNEL | EF DIR SELECTION STATE FLAG |
|---|---|---|---|---|
| 1 | XXXXX | 0 | 0 | OFF |
| 2 | YYYYY | 0 | 1 | OFF |

(56) References Cited

U.S. PATENT DOCUMENTS

| | | | |
|---|---|---|---|
| 2010/0311468 A1 | 12/2010 | Shi et al. | |
| 2013/0023309 A1* | 1/2013 | Holtmanns | H04W 4/60 455/558 |
| 2013/0144793 A1* | 6/2013 | Royston | G06Q 20/326 705/72 |
| 2013/0225239 A1* | 8/2013 | Wu | H04W 88/06 455/558 |
| 2014/0228039 A1 | 8/2014 | Zhao et al. | |
| 2014/0342719 A1* | 11/2014 | Lindholm | H04W 4/60 455/418 |
| 2015/0282060 A1* | 10/2015 | Huang-Fu | H04W 8/205 455/435.2 |
| 2015/0334761 A1* | 11/2015 | Liao | H04W 76/15 455/552.1 |
| 2015/0350878 A1 | 12/2015 | Li et al. | |
| 2015/0350879 A1* | 12/2015 | Li | H04W 88/06 455/558 |
| 2016/0029222 A1 | 1/2016 | Su et al. | |
| 2016/0157092 A1* | 6/2016 | Uy | H04L 67/025 455/419 |
| 2016/0203098 A1* | 7/2016 | Sekuru | G06F 12/1081 710/301 |
| 2016/0219421 A1 | 7/2016 | Shi et al. | |
| 2016/0314309 A1* | 10/2016 | Rozak-Draicchio | G06F 9/45558 |
| 2016/0374014 A1 | 12/2016 | Anyuru | |
| 2017/0013442 A1 | 1/2017 | Li et al. | |
| 2017/0171742 A1* | 6/2017 | Yang | G06F 3/0604 |
| 2018/0176887 A1 | 6/2018 | Strobl | |
| 2020/0100098 A1* | 3/2020 | Bai | H04W 8/183 |

FOREIGN PATENT DOCUMENTS

| | | |
|---|---|---|
| JP | 2004064657 A | 2/2004 |
| JP | 2007110607 A | 4/2007 |
| JP | 2011501913 A | 1/2011 |
| JP | 2016029791 A | 3/2016 |

* cited by examiner

| INPUT INTERFACE | AUTHENTICATION APPLICATION ID | INPUT LOGICAL CHANNEL | OUTPUT LOGICAL CHANNEL | EF DIR SELECTION STATE FLAG |
|---|---|---|---|---|
| 1 | XXXXX | 0 | 0 | OFF |
| 2 | YYYYY | 0 | 1 | OFF |

SIM ROUTER DEVICE, COMMUNICATION TERMINAL DEVICE, METHOD OF ROUTING, AND METHOD OF MANUFACTURING SIM

CROSS REFERENCE TO RELATED APPLICATION

The present application is a continuation application of International Patent Application No. PCT/JP2019/038271 filed on Sep. 27, 2019, which designated the U.S. and claims the benefit of priority from Japanese Patent Application No. 2018-195448 filed on Oct. 16, 2018. The entire disclosures of all of the above applications are incorporated herein by reference.

TECHNICAL FIELD

The present disclosure relates to a SIM router device, a communication terminal device, a method of routing by the SIM router device, and a method of manufacturing a SIM (Subscriber Identity Module).

BACKGROUND

In order to use a communication line with a communication terminal device such as a smartphone and cell phone, a SIM card is issued by the telecommunication carrier with information recorded to identify the subscriber information. Then, by inserting the SIM card into the communication terminal device, a subscriber who has signed up for the communication line can use the communication line. Since one SIM card can be inserted into one communication terminal device in principle, one communication terminal device can use the communication line provided by one telecommunication carrier in principle.

In recent years, there are communication terminal devices that can use multiple communication lines by inserting multiple SIM cards into one communication terminal device and selectively switching the networks. In this case, the baseband processor has SIM controllers for the SIM cards in addition to the baseband function unit such as a modem. There are three different technologies for using multiple SIM cards: DSSS (Dual SIM Single Stand-by), which allows for two SIM cards but only one standby at a time; DSDS (Dual SIM Dual Stand-by), which allows for two SIM cards and two standby at a time, but only one of them can be used for communication; and DSDA (Dual SIM Dual Acive), which allows for two SIM cards, and two SIM cards can be used for standby and communication at the same time.

SUMMARY

A SIM router device according to a first aspect of the present disclosure is configured to access a SIM that stores a first authentication application and a second authentication application. The SIM router device includes: a first input interface connected with a wireless baseband device that is configured to perform wireless communication; a second input interface connected with the wireless baseband device; a mapping information storage unit configured to acquire an authentication application list that lists the first authentication application and the second authentication application from the SIM, and store a mapping information in which the first input interface is associated with the first authentication application and the second input interface is associated with the second authentication application; and a controller configured to route, based on the mapping information, a first instruction received by the first input interface from the wireless baseband device to the first authentication application of the SIM, and a second instruction received by the second input interface from the wireless baseband device to the second authentication application of the SIM.

A communication terminal device according to a second aspect of the present disclosure includes: an antenna configured to receive a high frequency signal; a wireless baseband device configured to perform wireless communication and convert the high frequency signal received by the antenna into a baseband signal; and a SIM router device configured to receive, from the wireless baseband device, a first instruction and a second instruction generated from the baseband signal, and access a SIM that stores a first authentication application and a second authentication application. The SIM router device includes a first interface connected with the wireless baseband device, a second interface connected with the wireless baseband device, a mapping information storage unit, and a controller. The mapping information storage unit is configured to acquire an authentication application list that lists the first authentication application and the second authentication application from the SIM, and store a mapping information in which the first input interface is associated with the first authentication application and the second input interface is associated with the second authentication application. The controller is configured to route, based on the mapping information, the first instruction received by the first input interface from the wireless baseband device to the first authentication application of the SIM, and the second instruction received by the second input interface from the wireless baseband device to the second authentication application of the SIM.

A third aspect of the present disclosure is a method of routing by a SIM router device configured to access a SIM that stores a first authentication application and a second authentication application. The SIM router device includes a first input interface and a second input interface connected with a wireless baseband device configured to perform wireless communication. The method includes acquiring an authentication application list that lists the first authentication application and the second authentication application from the SIM; storing a mapping information in which the first input interface is associated with the first authentication application and the second input interface is associated with the second authentication application; routing, based on the mapping information, a first instruction received by the first input interface from the wireless baseband device to the first authentication application of the SIM and a second instruction received by the second input interface from the wireless baseband device to the second authentication application of the SIM.

A method of manufacturing a SIM according to a fourth aspect of the present disclosure includes: writing a first authentication application to the SIM, the first authentication application containing information for identifying subscribers to a first communication line; writing a second authentication application to the SIM, the second authentication application containing information for identifying subscribers to a second communication line; and writing an authentication application list that lists the first authentication application and the second authentication application.

A method of manufacturing a SIM according to a fifth aspect of the present disclosure includes: writing a second authentication application to the SIM in which a first authentication application has been written, the first authentication application containing information for identifying subscribers to a first communication line, the second authentication application containing information for identifying subscribers to a second communication line; and writing an authentication application list that lists the first authentication application and the second authentication application.

EMBODIMENTS

An embodiment of the present disclosure will be described below with reference to the drawings.

Embodiment

1. Configurations of SIM Router Device 100, Communication Terminal Device 10, and SIM 150

Figure 1:
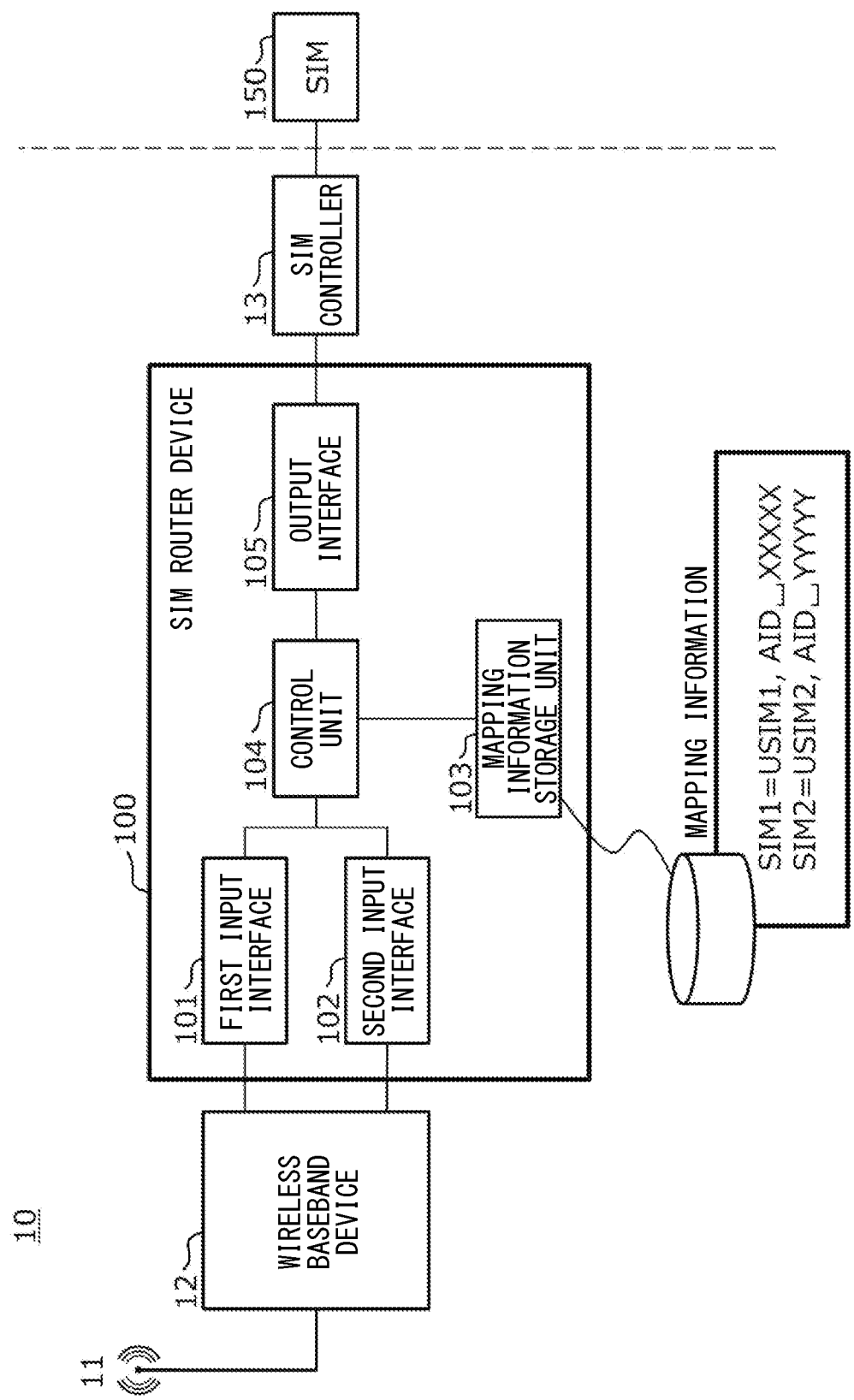
FIG. 1 is a block diagram illustrating a SIM router device and a communication terminal device according to an embodiment.

FIG. 1 is a block diagram illustrating a SIM router device 100 and a communication terminal device 10 including the SIM router device 100. The communication terminal device 10 includes an antenna 11, a wireless baseband device 12, the SIM router device 100, and a SIM controller 13. The communication terminal device 10 is configured to access a SIM 150 through the SIM controller 13. The communication terminal device 10 is connected with the SIM 150 to function as a communication terminal device. The communication terminal device 10 includes devices used by connecting with a communication line such as a personal computer, a car navigation system, and a vehicle electronic control unit in addition to mobile information terminal devices such as a cell phone, a smartphone and a tablet. The term "access" here of the present disclosure means not only to directly access to the SIM but also to indirectly access through the SIM controller or the like.

The antenna 11 is configured to transmit and receive high frequency signals. Any type of antenna may be used as the antenna 11.

The wireless baseband device 12 is configured to convert the high frequency signals received by the antenna 11 into baseband signals and also convert it into an instruction (command) that can be decoded by an application processor (not shown). The instruction is transmitted to the application processor and, where necessary, the SIM router device 100. The wireless baseband device 12 is configured to convert the instruction received from the application processor and the SIM router device 100 into the baseband signal, and further convert it into the high frequency signal to transmit the high frequency signal to the antenna 11. The wireless baseband device 12 includes a modem, for example.

The detailed configuration of the SIM router device 100 will be described later.

Based on the instruction received from the SIM router device 100, the SIM controller 13 converts it into an appropriate analog signal and transmits the analog signal to the SIM 150. The SIM controller 13 also converts the instruction received from the SIM 150 into a digital signal and transmits the digital signal to the SIM router device 100.

Figure 2:
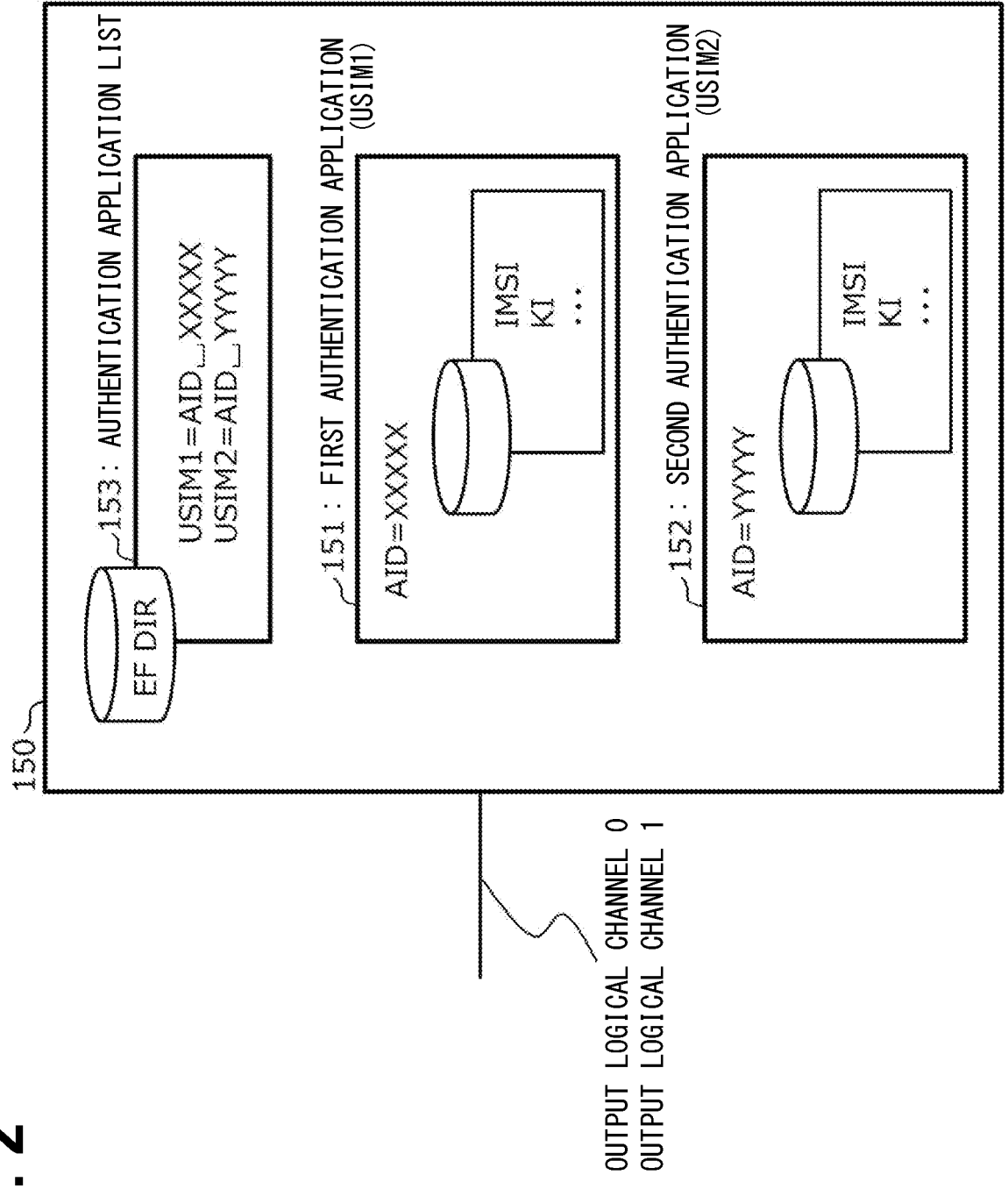
FIG. 2 is a block diagram explaining a configuration of the SIM according to the embodiment.

Next, the configuration of the SIM 150 will be described. The SIM 150 includes, as hardware, an IC chip on which CPU, RAM, ROM and the like are embedded. FIG. 2 shows the configuration of the SIM 150. The SIM 150 stores a first authentication application 151, a second authentication application 152, and an authentication application list 153. The number of the authentication applications is two or more. The state in which single SIM stores multiple authentication applications to function as multiple SIM is expressed as that the SIM is logically multiple. The "SIM" of the present disclosure includes not only a SIM which can be physically separated from a communication device such as a SIM card but also a logical SIM (eSIM) which is loaded in a memory of the communication terminal device and cannot be physically separated from the communication device.

The first authentication application 151 contains information for identifying subscribers to the first communication line, such as cell phone number information (MSISDN) for uniquely identifying a subscription to the first communication line, identification numbers (IMSI) assigned to the users, and authentication keys (KI). The first authentication application is published by a telecommunications carrier, for example. The first authentication application 151 is configured to identify the communication line using IMSI as an identifier, perform authentication using a key shared in advance with the network side, and derive the key for securing confidentiality and integrity of the wireless communication. The authentication application of the present disclosure at least contains information for identifying a subscriber and information used for authentication. The authentication application of the present disclosure may not work alone.

The second authentication application 152 contains information for identifying subscribers to the second communication line, which is the same as the first authentication application 151.

In the authentication application list 153, the first authentication application 151 and the second authentication application 152 are listed. Specifically, the authentication application list 153 is a table in which the first authentication application (USIM1) and a first application ID (AID XXXXX), and the second authentication application (USIM2) and a second application ID (AID YYYYY) are associated respectively. The authentication application list 153 is stored in EF DIR (Elementary File DIRectory) of the SIM 150. That is, a list of AIDs which are authentication application IDs is stored in the EF DIR. The authentication application list 153 may store the names of the authentication applications.

The configuration of the SIM router device 100 will be described with reference to FIG. 1. The SIM router device 100 includes a first input interface 101, a second input interface 102, a mapping information storage unit 103, a control unit 104, and an output interface 105. The SIM router device 100 is assumed to be composed of a semiconductor chip or a semiconductor module, but it can be in any form. Mobile information terminal devices such as cell phones may be used as the communication terminal device. When the mobile information terminal device has functions of the SIM router device 100, it may be used as the SIM router device.

The first input interface 101 is connected with the wireless baseband device 12 configured to perform wireless communication, and receives a first instruction from the wireless baseband device 12. The first input interface 101 may include multiple input logical channels. The term "input interface" of the present disclosure means not only a physical interface but also a logical channel that is a logical interface. The state where the input interface includes multiple logical interfaces is expressed as that the input interface is logically multiple. The term "connected" here of the present disclosure means that chips are connected when the wireless baseband device is mounted on a different chip than a chip on which the SIM router device is mounted. The term "connected" of the present disclosure means that the wireless baseband device and the SIM router device are connected inside the chip when the wireless baseband device and the SIM router device are mounted on physically same chip.

The second input interface 102 is connected with the wireless baseband device 12 configured to perform wireless communication, and receives a second instruction from the wireless baseband device 12. The second input interface 102 may include multiple input logical channels. The number of the input interfaces may vary depending on the number of the authentication applications, and is not limited to two.

The mapping information storage unit 103 is configured to acquire the authentication application list 153 from the SIM 150, and store mapping information in which: the first input interface 101 (SIM1) is associated with the first authentication application or the application ID (AID XXXXX) assigned to the first authentication application; and the second input interface 102 (SIM2) is associated with the second authentication application or the application ID (AID YYYYY) assigned to the second authentication application. The term "associate" of the present disclosure means not only directly associating the input interface and the authentication application with each other but also indirectly associating these via other information such as the identifier.

Based on the mapping information stored in the mapping information storage unit 103, the control unit 104 routes the first instruction received by the first input interface 101 from the wireless baseband device 12 to the first authentication application 151 of the SIM 150, and routes the second instruction received by the second input interface 102 from the wireless baseband device 12 to the second authentication application 152 of the SIM 150. The term "route" of the present disclosure means not only directly passing instructions to the authentication application in the SIM but also indirectly passing instructions to the authentication application through other functional units such as the SIM controller.

The output interface 105 is configured to transmit the first instruction and the second instruction received from the control unit 104 to the SIM 150. The output interface 105 may include multiple output logical channels.

Since the SIM router device 100 of the present embodiment includes two input interfaces as described above, the wireless baseband device 12 recognizes that there are two SIMs. According to the SIM router device 100 of the present embodiment, the instructions transmitted from the wireless baseband device 12 can be routed to corresponding one of authentication applications.

2. SIM Routing Method

Next, a SIM routing method which is the operation of the SIM router device 100 will be described. The SIM routing method includes activating, mapping, and routing.

(1) Activation Operation of SIM Router Device 100 and SIM 150

Figure 3:
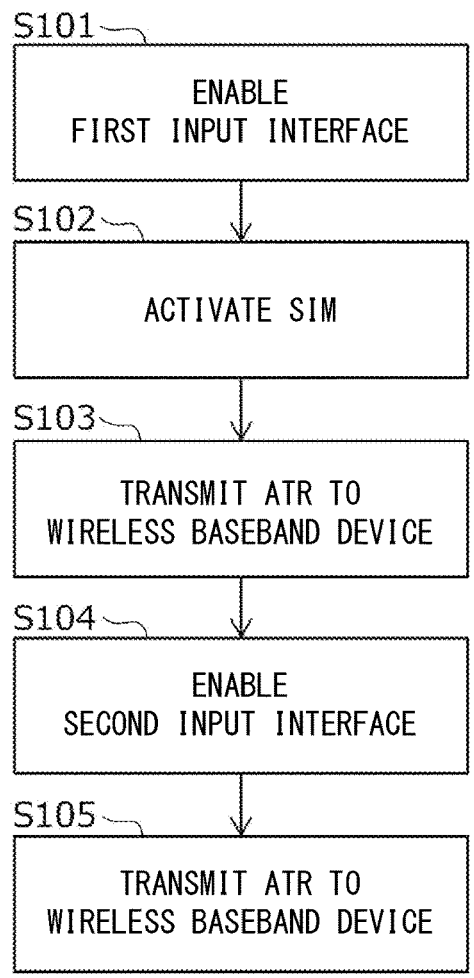
FIG. 3 is a flowchart showing an activation process of the SIM router device and the SIM according to the embodiment.

FIG. 3 shows steps to activate the SIM router device 100 and SIM 150. The wireless baseband device 12 recognizes the first input interface 101 and the second input interface 102 of the SIM router device 100 as the SIM. In S101, the first input interface 101 of the SIM router device 100 is enabled. For example, the first input interface 101 of the SIM router device 100 is supplied with power. When one of the input interfaces is enabled in a situation where none of the input interfaces is active, the SIM router device 100 may transmit a part of ATR (Answer to Reset) corresponding to its first byte to the wireless baseband device 12.

In S102, the SIM router device 100 activates the SIM 150 through the SIM controller 13.

In S103, the SIM router device 100 stores the ATR (Answer to Reset) transmitted from the SIM 150 and transmits the ATR to the wireless baseband device 12. When the first byte of the ATR has already been transmitted to the wireless baseband device 12 after S101, the SIM router device 100 transmits the remaining parts of the ATR.

In S104, the second input interface 102 of the SIM router device 100 is enabled. For example, the second input interface 102 of the SIM router device 100 is supplied with power. Since the SIM router device 100 and the SIM 150 have been activated through the first input interface 101 in S101, the activation of the SIM 150 is not performed at this time. In S105, the SIM router device 100 transmits the stored ATR to the wireless baseband device 12.

(2) Mapping Operation of SIM Router Device 100

Figure 4:
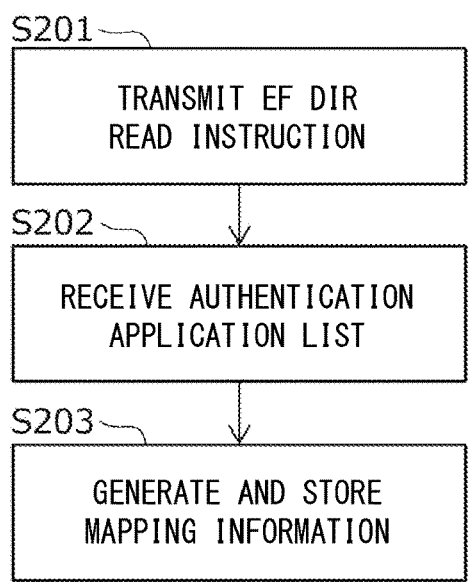
FIG. 4 is a flowchart showing a mapping process of the SIM router device according to the embodiment.
Figures 5, 6:
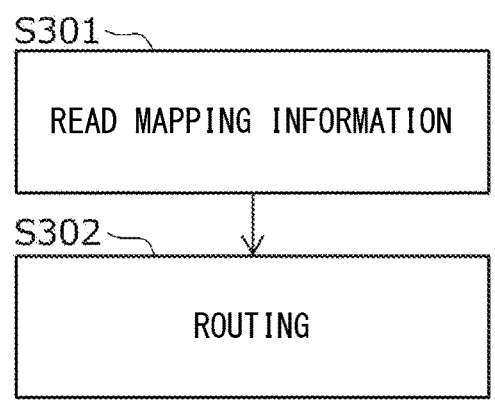
FIG. 5 is a diagram showing contents of mapping information stored in the SIM router device according to the embodiment.
FIG. 6 is a flowchart showing a routing process of the SIM router device according to the embodiment.

FIG. 4 shows a mapping process of the SIM router device 100. FIG. 5 shows contents of mapping information stored in the mapping information storage unit 103. In S201, the SIM router device 100 transmits a read instruction for reading the authentication application list 153 stored in the EF DIR to the SIM 150 through the output interface 105.

In S202, the SIM router device 100 receives the authentication application list 153 transmitted from the SIM 150 through the output interface 105. The authentication application list 153 contains information in which the first authentication application (USIM1) and the first application ID (AID XXXXX) are associated and the second authentication application (USIM1) and the second application ID (AID YYYYY) are associated.

The SIM router device 100 assigns the authentication applications to the input interfaces based on the received authentication application list 153. Specifically, in S203, the SIM router device 100 generates the mapping information in which the first input interface 101 (SIM1) is associated with the first authentication application and the second input interface 102 (SIM2) is associated with the second authentication application, and stores the mapping information in the mapping information storage unit 103.

FIG. 5 is a table showing the contents of the mapping information. In the mapping information, the input interface is associated with the authentication application ID for identifying the authentication application. As shown in FIG. 5, the input logical channel of the input interface, the output logical channel of the output interface, and an EF DIR selection state flag are associated with each other. The input logical channel is a logical channel used in the first input interface 101 and the second input interface 102, and a logical channel 0 is set for each input interface as default. The output logical channel is a logical channel used in the output]interface 105, and 0 is set as a default value for the output logical channel corresponding to the input logical channel 0 of the first input interface 101. In the present embodiment, 1 representing an open logical channel number is set for the output logical channel corresponding to the input logical channel 0 of the second input interface 102. The open logical channel is acquired by sending an instruction for opening a logical channel to the SIM 150. In this example, the output logical channel is logically multiple, but the input logical channel is not logically multiple. The input logical channel may be configured to be logically multiple. The EF DIR selection state flag is a flag representing whether the EF DIR is selected in the input interface. For example, when an EF DIR selection command is received by any one of the input interfaces, the EF DIR selection state flag corresponding to the combination of the input interface and the input logical channel is turned on. When the EF DIR selection command is received by another input interface, the EF DIR selection state flag corresponding to the combination of the input interface and the input logical channel is turned on. According to this, the SIM router device 100 is configured to transmit only the information corresponding to the required authentication application to the wireless baseband device 12.

The above described mapping process is executed when the SIM router device 100 is activated for the first time after inserting the SIM 150. At later activations, the SIM router device 100 compares acquired information with the mapping information stored in the mapping information storage unit 103. When the acquired information is the same as the stored mapping information, it is not necessary to overwrite information, and the mapping information stored in the mapping information storage unit 103 is used.

(3) Routing Operation of SIM Router Device

FIG. 6 shows a routing process of the SIM router device 100. In S301, the control unit 104 of the SIM router device 100 reads the mapping information in the mapping information storage unit 103.

In S302, based on the read mapping information, the control unit 104 routes the first instruction received by the first input interface 101 from the wireless baseband device 12 to the first authentication application 151 of the SIM 150, and routes the second instruction received by the second input interface 102 from the wireless baseband device 12 to the second authentication application 152 of the SIM 150. Specifically, when the input interface receives the instruction from the wireless baseband device 12, the instruction is forwarded to the corresponding output logical channel based on the mapping information, and the response from the SIM 150 is forwarded to the logical channel of the corresponding input interface based on the mapping information. However, when the EF DIR selection state flag corresponding to the combination of the input interface and the input logical channel is ON, and an EF DIR read command is received, the SIM router device 100 does not route to the SIM 150 but only returns a record corresponding to the input interface based on the mapping information storage unit 103.

(4) Routing Operation with Half-Duplex Communication

An external interface of the conventional SIM is a half-duplex communication interface defined by ISO7816. The half-duplex communication interface has the limitations that: multiple transmissions cannot be performed at the same time; transmission and reception cannot be performed at the same time; and the next instruction cannot be transmitted until a response to one instruction is returned. Accordingly, when the half-duplex communication interface is used in the SIM 150 of the present disclosure, a process similar to FIFO is needed. That is, when the control unit 103 routes the first instruction to the first authentication application 151 of the SIM 150, the control unit 103 routes the second instruction to the second authentication application 152 of the SIM 150 after the control unit 103 receives the response to the first instruction from the SIM 150. The term "after" here means not only immediately after receiving the response to the first instruction but any time after receiving the response. For example, the communication with the wireless baseband device may be performed before the routing of the second instruction.

Figure 7:
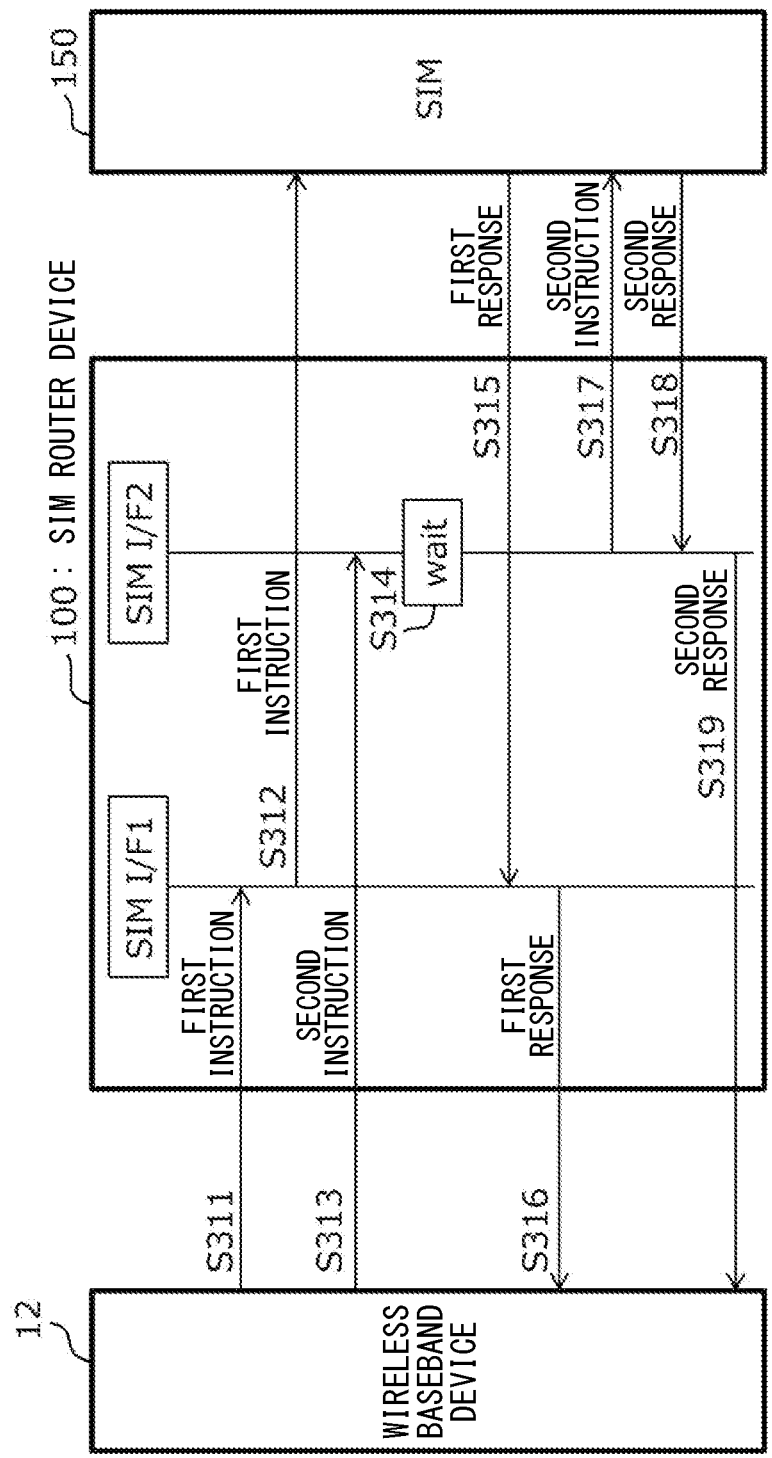
FIG. 7 is a diagram for explaining a routing operation of the SIM router device in a case where the SIM has a half-duplex communication interface, according to the embodiment.

FIG. 7 is a diagram illustrating the routing operation when the SIM 150 has the half-duplex communication interface. In S311, the wireless baseband device 12 transmits the first instruction to the first input interface 101 of the SIM router device 100. In S312, the control unit 104 of the SIM router device 100 transmits the first instruction to the SIM 150 through the output interface 105.

In S313, the wireless baseband device 12 transmits the second instruction to the second input interface 102 of the SIM router device 100. In S314, the control unit 104 suspends the process regarding the second instruction until the control unit 104 receives the first response to the first instruction from the SIM 150.

In S315, the first response to the first instruction from the SIM 150 is received by the output interface 105. In S316, the control unit 104 transmits the first response to the wireless baseband device 12 through the first input interface.

In S317, the control unit 104 resumes the pending process regarding the second instruction and transmits the second instruction to the SIM 150 through the output interface 105.

In S318, the second response to the second instruction from the SIM 150 is received by the output interface 105. In S319, the control unit 104 transmits the second response to the wireless baseband device 12 through the second input interface.

According to the SIM routing method of the present embodiment, standby and communication can be performed at the same time with the SIM having multiple authentication applications. Moreover, even when the half-duplex communication interface is used in the SIM, it is possible to access multiple authentication applications of the SIM without malfunction.

3. Method of Manufacturing SIM

As described above, the SIM 150 of the present embodiment stores the first authentication application 151, the second authentication application 152, and the authentication application list 153 as shown in FIG. 2. This section describes a method of manufacturing the SIM 150 of the present embodiment.

(1) Manufacturing from New SIM

A method of manufacturing the SIM of the present embodiment from the SIM in which nothing has been recorded will be described.

First, the first authentication application is written to the SIM 150. Next, the second authentication application is written to the SIM 150. Then, the authentication application list 153 listing the first authentication application 151 and the second authentication application 152 is generated, and the authentication application list 153 is written to the SIM 150. Specifically, the first authentication application 151 is associated with the first application ID (AID XXXXX) and the second authentication application 152 is associated with the second application ID (AID YYYYY), and then these information is written to the EF DIR of the SIM 150 as the authentication application list 153. The term "write" here of the present disclosure means recording the information in the SIM. The information may be written to the SIM by a device around the SIM. The information may be written to the SIM in response to an instruction from a remote location. For example, the information may be recorded according to the instruction from a server device.

According to the method of manufacturing the SIM of the embodiment, it is possible to provide a SIM having multiple authentication applications.

(2) Manufacturing from Finished SIM

A method of manufacturing the SIM of the present embodiment by adding the authentication application to a finished SIM, i.e. a SIM in which one authentication application is stored, will be described.

First, the second authentication application 152 is written to the SIM 150 in which the first authentication application 151 has been written. Then, the authentication application list 153 listing the first authentication application 151 and the second authentication application 152 is generated, and the authentication application list 153 is written to the SIM 150. Specifically, the first authentication application 151 is associated with the first application ID (AID XXXXX) and the second authentication application 152 is associated with the second application ID (AID YYYYY), and then these information is written to the EF DIR of the SIM 150 as the authentication application list 153. When the EF DIR has been already created at the time when only the first authentication application 151 is stored, the combination of the second authentication application 152 and the second application ID associated with each other may be added to the EF DIR. That is, the timing when the first authentication application 151 and the first application ID are associated to write as the authentication application list 153 is not necessarily the same as the timing when the second authentication application 152 and the second application ID are associated to write as the authentication application list 153. These may be understood as single step. Further, information that is not stored in the first authentication application 151 or the second authentication application 152, e.g. a unique identification number (ICCID) assigned to the SIM 150, may be merged. That is, only one of the information that has been already written in the finished SIM or the added information is used.

According to the method of manufacturing the SIM of the present embodiment, the SIM having multiple authentication applications can be provided by adding another authentication application to the finished SIM.

(3) Conclusion

Any of the above two cases can be realized by using a writing device configured to write the information to the SIM. For example, when the SIM can be physically separated from the communication terminal device, e.g. a SIM card, the necessary information can be written by inserting the SIM card into the IC card writing device. When the SIM is implemented in the memory of the communication terminal device, e.g. a logical SIM, the necessary information can be written through an interface of the communication terminal device. Moreover, in any form of SIM, and in any of the above two cases, the necessary information can be written from the server wirelessly or by wire. Since the SIM card can include a CPU and a memory, the SIM card may be configured to generate the authentication application list to write it to the EF DIR. The logical SIM may be configured to generate the authentication application list using the CPU of the communication terminal device to write it to the EF DIR after the authentication application is written.

4. Package forms of SIM router device

Figure 8A:
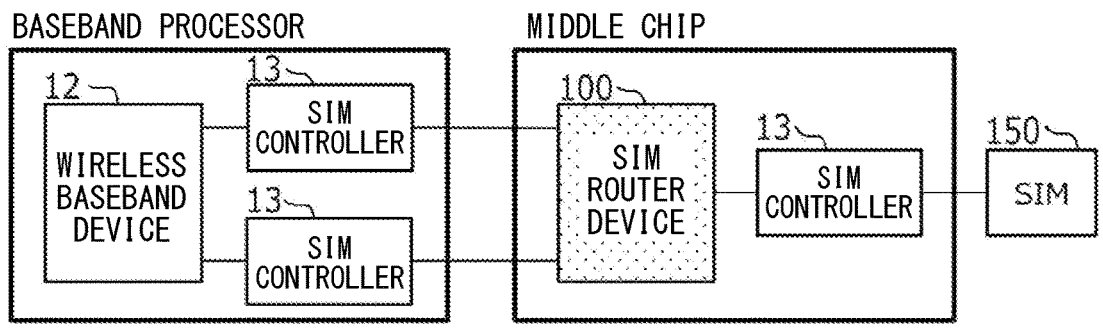
FIG. 8A is a block diagram illustrating a form of a package of the SIM router device according to the embodiment.
Figure 8B:
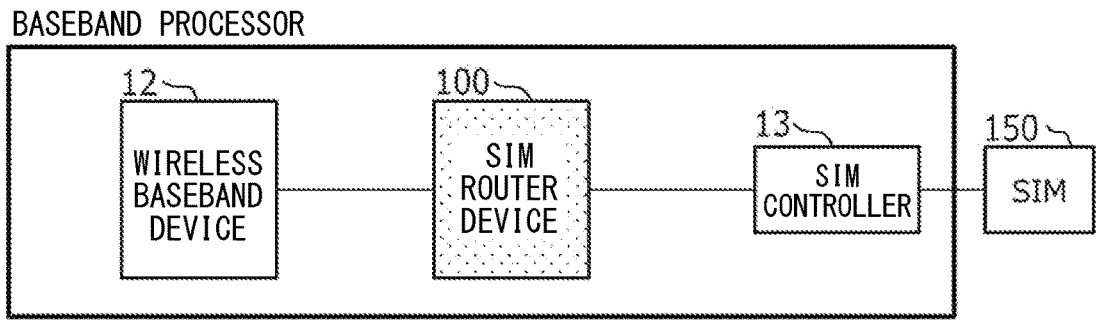
FIG. 8B is a block diagram illustrating a form of the package of the SIM router device according to the embodiment.
Figure 8C:
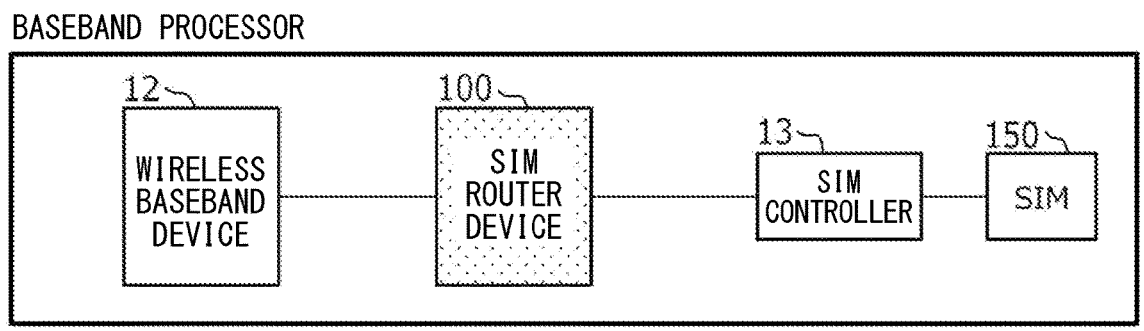
FIG. 8C is a block diagram illustrating a form of the package of the SIM router device according to the embodiment.

FIGS. 8A, 8B, 8C are diagrams illustrating package forms of the SIM router device 100. The SIM router device 100 of the present embodiment may be provided as single semiconductor package in which each block shown in FIG. 1 is provided as a hardware and be connected with external wireless baseband device 12 and the SIM controller 13. The SIM router device 100 may be configured as shown in FIGS. 8A-8C. In the examples shown in FIGS. 8A, 8B, 8C, the SIM 150 is logically multiple.

(1) Separated from Baseband Processor

In a first example shown in FIG. 8A, the SIM router device 100 and the SIM controller 13 are provided as a middle chip that is a single semiconductor package and is separated from the baseband processor having the wireless baseband device 12. In this case, a conventional baseband processor can be used as the baseband processor of the present embodiment as long as the baseband processor supports DSDA and the like, and accordingly the communication terminal device of the present embodiment can be realized only by installing the middle chip.

(2) Integrated with Baseband Processor

In a second example shown in FIG. 8B, the SIM router device 100 and the SIM controller 13 are provided as single semiconductor package. In this case, the wireless baseband device 12 and the SIM router device 100 are connected through one interface, but the interface is logically multiple with the logical channels. The wireless baseband device 12 and the SIM router device 100 may be connected through two physical interfaces. According to this example, the baseband processor can be provided as single semiconductor package.

(3) Integrated with SIM

In a third example shown in FIG. 8C, the SIM 150 is provided as a logical SIM and included in single semiconductor package. According to this example, the baseband processor including the SIM 150 can be provided as single semiconductor package.

5. Other Modifications

The communication terminal device of the present embodiment can be used as any communication terminal device connected with multiple communication lines regardless of its purpose. When the communication terminal device is used as a communication terminal device for a vehicle (including a vehicle electronic control unit), the configuration may be as follows. The vehicle includes not only automobiles but also motorcycles. The term "device for a vehicle" means not only devices always mounted on a vehicle but also devices that are not always mounted on a vehicle and devices that are not mounted on a vehicle but the control target is a vehicle.

There are two possible applications for communication in vehicles. One is to use it for guidance and rescue services, for example, led by the car manufacturer. Due to the fact that these services are often used in emergencies, it may be desirable to have a line with guaranteed communication quality. Or, as in the case of road-to-vehicle and vehicle-to-vehicle communication, it is used for safe operation and automatic driving. Due to the nature of these applications, which require immediate decisions and information exchange, it may be desirable to have a line with guaranteed communication quality.

The other application is to connect to various sites via the internet to obtain information such as music and images as a function of car navigation systems and in-car TVs. Since most of these applications do not require any particular urgency, the emphasis is on high capacity and low cost, and quality assurance is not a high priority.

Thus, by using two lines with different communication quality, the communication terminal device for the vehicle can appropriately distribute various information associated with the use of the vehicle to the different lines. Instead of communication quality, lines having different capacities and prices may be used.

(Conclusion)

The features of the devices and methods according to the embodiment of the present disclosure have been described above.

Terms used in the embodiment are examples and may be replaced with synonymous terms or terms having a synonymous function.

The block diagram used in the description of each embodiment is a diagram in which the configurations of devices and the like are classified and organized by function. These functional blocks may be provided by any combination of hardware or software. Further, since the functions are shown, the block diagram can be understood as disclosure of the method and the program that implements the method.

Order of functional blocks that can be grasped as processing, a sequence, and a method described in relation to each embodiment may be changed unless some restriction is imposed, for example, a result from one step is utilized at another step.

The terms "first" and "second" used in the present disclosure are for discriminating two or more configurations and methods of the same kind and do not limit order or superiority or inferiority. The terms do not necessarily refer to different components but may refer to the same component.

The present disclosure is implemented not only by dedicated hardware having a configuration and a function described in relation to each embodiment. The present disclosure can also be implemented as a combination of a program for implementing the present disclosure, recorded on such a recording medium as memory and a hard disk and general-purpose hardware including dedicated or general-purpose CPU, memory, or the like, capable of executing the program.

A program may be stored in a non-transitory tangible storage medium including (i) an external storage (e.g., hard disk, USB memory, CD/BD), or (ii) an internal storage (e.g., RAM, ROM) in a special-purpose or general-purpose hardware (e.g., computer). Such a program may be downloaded to the storage medium in the hardware via a communication link from a server. As a result, it is possible to provide a latest function by updating the program.

The SIM router device and communication terminal device of this disclosure can be used for any purpose as long as they use multiple communication lines. An electronic control unit for a vehicle is an example. Moreover, the form does not matter. Finished products such as mobile information terminal devices, personal computers, and car navigation system, semi-finished products such as vehicle electronic control units and a communication modules, and parts such as semiconductor chips and semiconductor modules are examples.

According to the present disclosure, multiple communication lines can be simultaneously used with a SIM having information of the communication lines. Accordingly, the number of the SIM to be issued can be reduced. Further, the time and the cost for issuing the SIM can be saved. Moreover, the time and the cost for managing the SIM can be saved.

What is claimed is:

1. A SIM router device configured to access a single SIM that stores a first authentication application and a second authentication application, the SIM router device comprising:
a first input interface connected with a wireless baseband device that is configured to perform wireless communication;
a second input interface connected with the wireless baseband device, the first input interface being different from the second input interface;
a mapping information storage unit configured to
acquire an authentication application list that lists the first authentication application and the second authentication application from the single SIM, and
store a mapping information in which the first input interface is associated with the first authentication application and the second input interface is associated with the second authentication application; and
a controller configured to route, based on the mapping information,
a first instruction received by the first input interface from the wireless baseband device to the first authentication application of the single SIM, and
a second instruction received by the second input interface from the wireless baseband device to the second authentication application of the single SIM.

2. The SIM router device according to claim 1, wherein when the controller routes the first instruction to the first authentication application, the controller routes the second instruction to the second authentication application after the controller receives a response to the first instruction from the single SIM.

3. The SIM router device according to claim 1, wherein an output logical channel of an output interface is associated with the mapping information.

4. The SIM router device according to claim 1, wherein input logical channels of the first input interface and the second input interface are associated with the mapping information.

5. The SIM router device according to claim 1, wherein a flag information indicating a selection state of an EF DIR is associated with the mapping information.

6. A communication terminal device comprising:
an antenna configured to receive a high frequency signal;
a wireless baseband device configured to perform wireless communication and convert the high frequency signal received by the antenna into a baseband signal; and
a SIM router device configured to
receive, from the wireless baseband device, a first instruction and a second instruction generated from the baseband signal, and
access a single SIM that stores a first authentication application and a second authentication application, wherein
the SIM router device includes a first input interface connected with the wireless baseband device, a second input interface connected with the wireless baseband device, the first input interface being different from the second input interface, a mapping information storage unit configured to
acquire an authentication application list that lists the first authentication application and the second authentication application from the single SIM, and store a mapping information in which the first input interface is associated with the first authentication application and the second input interface is associated with the second authentication application, and a controller configured to route, based on the mapping information,
the first instruction received by the first input interface from the wireless baseband device to the first authentication application of the single SIM, and the second instruction received by the second input interface from the wireless baseband device to the second authentication application of the single SIM.

7. A method of routing by a SIM router device configured to access a single SIM that stores a first authentication application and a second authentication application, the SIM router device including a first input interface and a second input interface connected with a wireless baseband device configured to perform wireless communication, the method comprising:

acquiring an authentication application list that lists the first authentication application and the second authentication application from the single SIM;

storing a mapping information in which the first input interface is associated with the first authentication application and the second input interface is associated with the second authentication application; and routing, based on the mapping information, a first instruction received by the first input interface from the wireless baseband device to the first authentication application of the single SIM and a second instruction received by the second input interface from the wireless baseband device to the second authentication application of the single SIM;

wherein the first input interface is different from the second input interface.

\* \* \* \* \*